Oct. 12, 1948.  J. O'CONNELL  2,451,301

APPARATUS FOR THE MOLDING OF BUTTER AND LIKE PRODUCTS

Filed June 23, 1945  6 Sheets-Sheet 1

Inventor
Joseph O'Connell
By
Williams, Bradbury & Hinkle
Attorneys

Oct. 12, 1948.  J. O'CONNELL  2,451,301
APPARATUS FOR THE MOLDING OF BUTTER AND LIKE PRODUCTS
Filed June 23, 1945  6 Sheets-Sheet 2

Inventor:
Joseph O'Connell
By Williams, Bradbury & Hinkle
Attorneys

Oct. 12, 1948.    J. O'CONNELL    2,451,301
APPARATUS FOR THE MOLDING OF BUTTER AND LIKE PRODUCTS
Filed June 23, 1945    6 Sheets-Sheet 3

Inventor:
Joseph O'Connell

Oct. 12, 1948. J. O'CONNELL 2,451,301
APPARATUS FOR THE MOLDING OF BUTTER AND LIKE PRODUCTS
Filed June 23, 1945 6 Sheets-Sheet 4

Inventor
Joseph O'Connell
By Williams, Bradbury + Hinkle
Attorneys

Oct. 12, 1948.  J. O'CONNELL  2,451,301
APPARATUS FOR THE MOLDING OF BUTTER AND LIKE PRODUCTS
Filed June 23, 1945  6 Sheets-Sheet 5

Inventor
Joseph O'Connell
By Williams, Bradbury & Hinkle
Attorneys

Oct. 12, 1948. J. O'CONNELL 2,451,301
APPARATUS FOR THE MOLDING OF BUTTER AND LIKE PRODUCTS
Filed June 23, 1945 6 Sheets-Sheet 6

Inventor
Joseph O'Connell
By Williams, Bradbury & Hinkle
Attorneys

Patented Oct. 12, 1948

2,451,301

UNITED STATES PATENT OFFICE 2,451,301

APPARATUS FOR THE MOLDING OF BUTTER AND LIKE PRODUCTS

Joseph O'Connell, Kensington, Victoria, Australia

Application June 23, 1945, Serial No. 601,210
In Australia May 18, 1944

20 Claims. (Cl. 31—44)

The principal objective of the present invention is to provide an improved apparatus for continuously and automatically forming mouldable materials or products such as butter, margarine and the like, into blocks of predetermined dimensions and/or weight, the output of blocks from the apparatus being dependent on the rate of input or feeding of the material into the apparatus. The apparatus is particularly though not exclusively adapted for use with the apparatus the subject of the prior Australian Patent No. 104,232.

With the above stated object in view the apparatus according to the broadest aspect of the invention comprises a mould for the reception of the mouldable product, means for moving the mould from a mould filling position to a mould discharge position and returning said mould to the filling position, and means operative in response to the filling of the mould to actuate said first mentioned means to move said mould between said positions. More specifically in one embodiment of the invention there is provided a multiple number of moulds for the reception of the mouldable product, means for moving the moulds in unison and successively from a mould filling position to a mould discharge position and returning said moulds to the filling position, and means operative in response to the filling of each mould to actuate said first mentioned means to move said moulds one step in the cycle of movement between said positions.

Accordingly in this embodiment there is an intermittent movement of the moulds between the mould filling and discharge positions, governed by the rate of injection or filling of the mouldable product into the mould at the filling position, so that the filling, discharging and returning of the moulds in succession to the filling station is a continuous cycle entirely dependent on the rate at which the mouldable product is fed or delivered to a mould at the filling station of the apparatus.

After the filling of each mould, the moulds are moved in unison to bring the following empty mould to the filling position and one of the filled moulds to the discharging position, whereupon the moulds remain stationary during the filling of the former mould at this filling position. Thus the moulds are subjected to a step by step movement, each step or displacement being followed by an interval of rest, the duration of which is dependent upon the rate of filling of the mould located at the filling position.

The moulds may be arranged to move in a continuous path of travel, so that an intermittent movement brings each mould in turn to the filling station, then moves the filled mould by stages to the discharge station, at which latter the block of moulded material is ejected, and finally returns the empty mould to the filling station.

The accompanying drawings depict practical arrangements of the invention for the moulding of large and small blocks of butter respectively.

Figure 8:
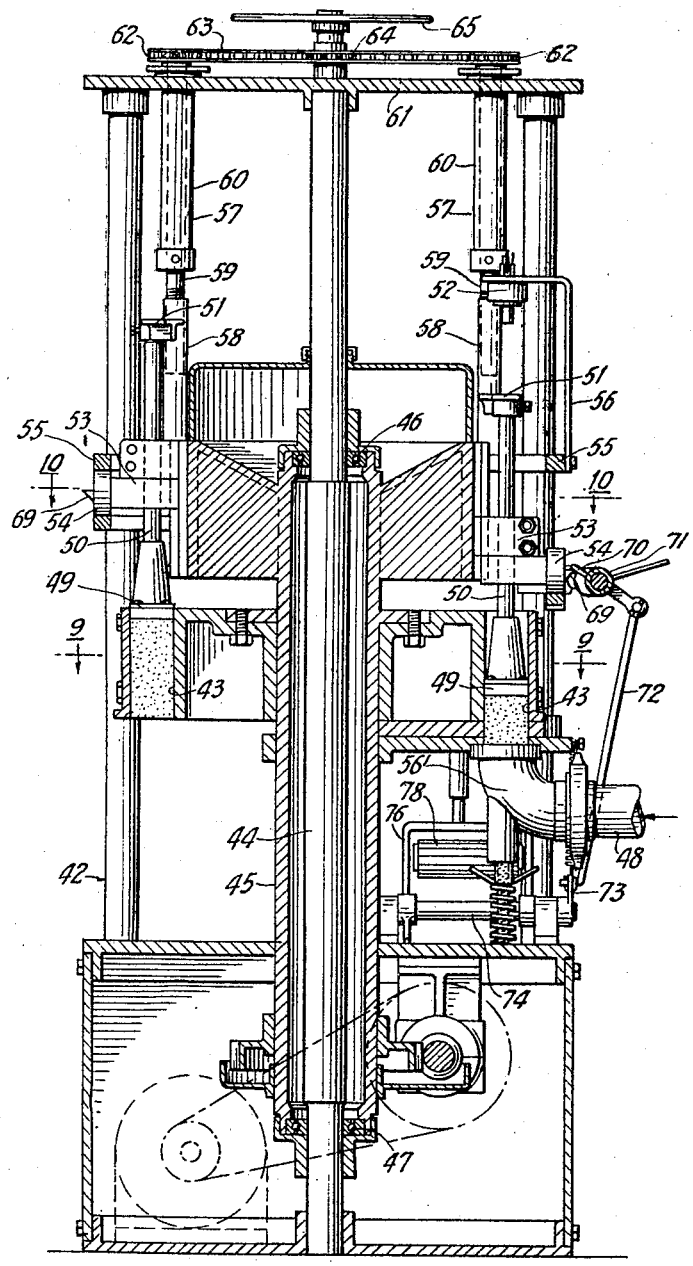
Figure 8 is a sectional elevation of the moulding apparatus illustrated in Figure 7.
Figure 9:
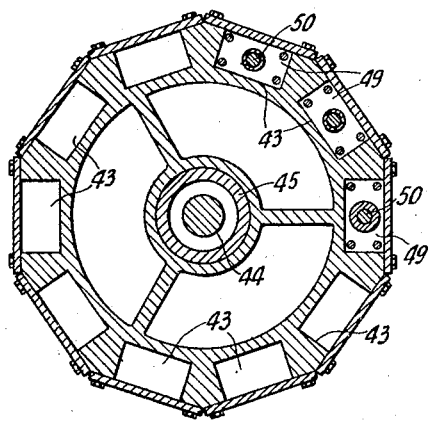
Figure 10:
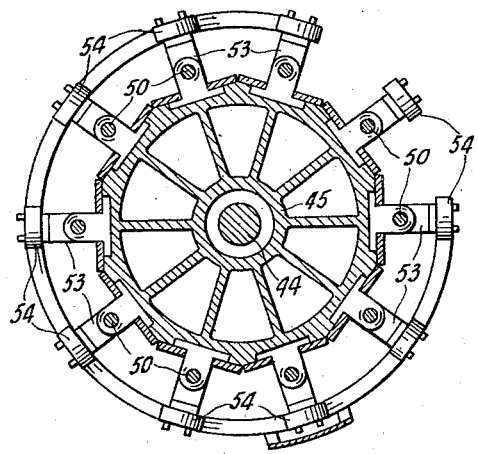

Figures 9 and 10 are sectional plan views on the line 9—9 and 10—10 respectively in Figure 8.

Figure 7:
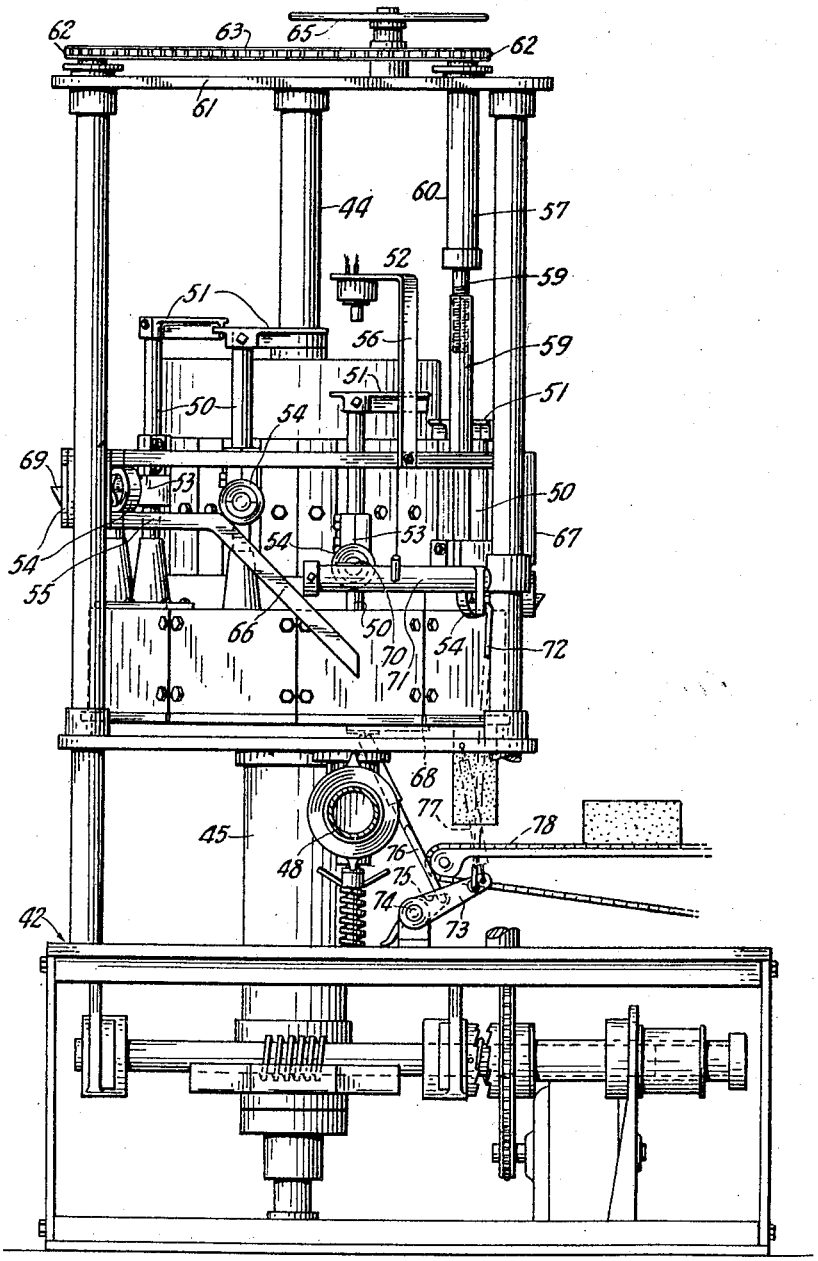
Figure 7 is a side elevation of modified apparatus for automatically moulding blocks of relatively small size, such as blocks of butter of one pound weight.
Figure 11:
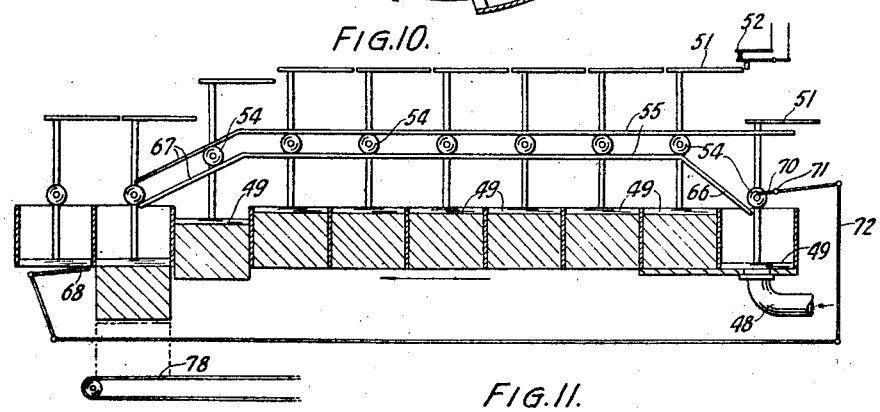

Figure 11 is a diagrammatic view illustrative of the sequence of operations in the moulding apparatus shown in Figures 7 and 8.

Referring to Figures 1 to 6, the numeral 1 indicates generally a supporting frame carrying a bank of vertically disposed moulds 2, preferably four in number, each mould having a capacity of fifty-six pounds of butter or the like, and the said moulds 2 being spaced in fixed relation to one another and at equal intervals in circular arrangement about a central axis or post 3 fixed in the supporting frame 1.

The bank of moulds 2 is carried by a sleeve 4 mounted upon bearing 5 and 6 whereby the said bank is freely rotatable about the central axis or post 3. In being rotated each mould 2 registers in succession with an overhead feed pipe 7 delivering under pressure the butter to be moulded.

Figure 2:
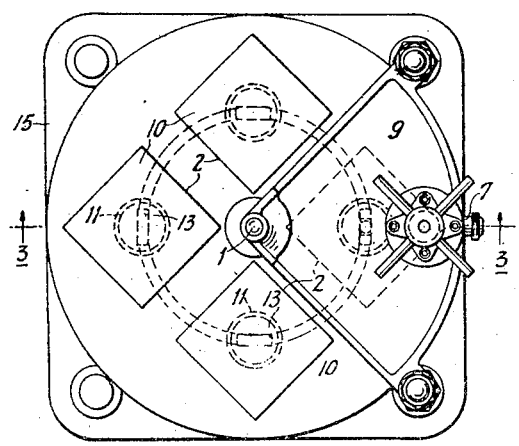
Figure 2 is a plan of the apparatus shown in Figure 1.

When one of the moulds 2 is in register with the feed pipe 7, the said mould 2 and its adjacent surrounding top surface 8 are covered by a close contacting quadrant plate 9, see particularly Figure 2.

Each mould 2 is provided with a piston 10 having an extension 11 movable within a slotted guide 12; the lower end of the extension 11 being provided with a roller 13 located on the vertical centre line of the piston 10 and rotatable on a spindle 11a carried by the extension 11. The roller 13 is adapted to engage an inclined ramp 14 concentrically mounted on a platform 15 below the bank of moulds 2 for the purpose of controlling the position of the pistons 10 within the moulds 2 during the intermittent rotation of the bank of moulds 2 as hereinafter described.

Figure 3:
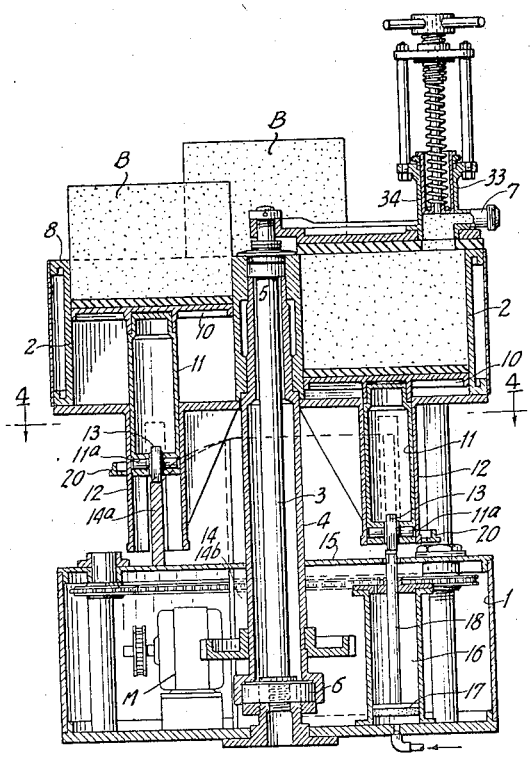
Figure 3 is a sectional elevation on the line 3—3 in Figure 2.

Located under the platform 15 is a cylinder 16 fitted with a plunger 17 from which extends a stem or rod 18 positioned in vertical alignment with the centre of a mould 2 located in the charging position so that the roller 13 mounted on the lower end of the extension 11 of the piston 10 of the said mould is in register and contacts with the end of the stem 18 of the plunger 17 (see Figure 3). The cylinder 16 is connected to a constant compressed air supply (not shown) the pressure of which in acting upon the plunger 17 imposes through the stem 18 and roller 13 a yielding resistance to the downward movement of the piston 10 within the mould 2 during the period in which the product to be moulded is being delivered through the feed pipe 7 under pressure into said mould 2, as for example from the extruder section of the apparatus forming the subject of Commonwealth Letters Patent No. 104,232.

Figure 4:
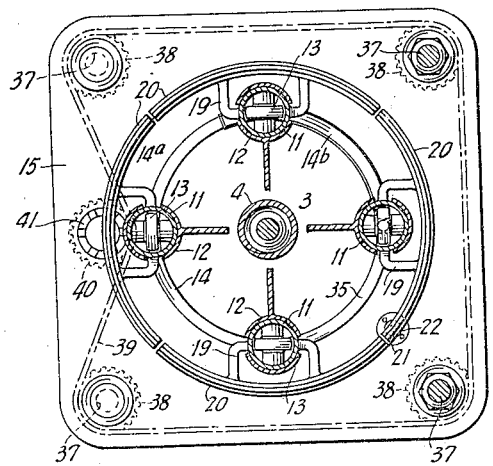
Figure 4 is a sectional plan on the line 4—4 in Figure 3.
Figure 5:
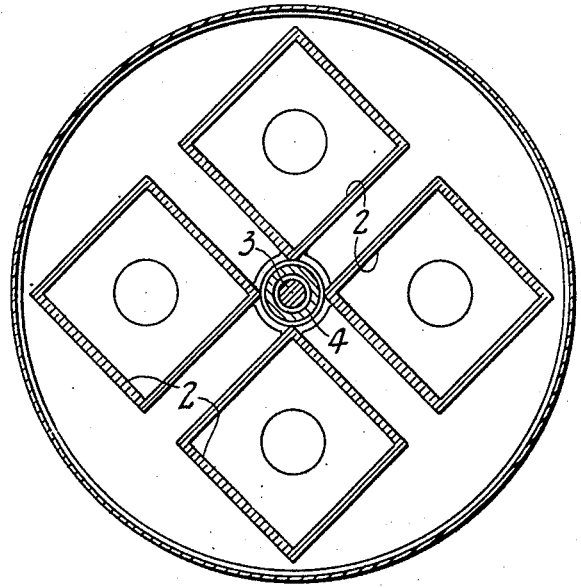
Figure 5 is a sectional plan of the mould assembly or casting.

Secured to and projecting outwardly from each piston extension 11 is a support 19 carrying a switch operating plate 20, of predetermined length and arcuate form, see particularly Figure 4. The arcuate plates 20 are concentric with the bank of moulds 2 about the central post 3, and each of said plates moves in unison with its associated piston 10 during the filling of the respective mould 2.

When one of the moulds 2 is in the filling position in readiness to be charged with butter through the feed pipe 7, the piston 10 in said mould is flush with the surrounding top surface 8 of the mould and accordingly the associated arcuate plate 20 is in the raised position. Moreover the plunger 17 of the compressed air cylinder 16 is likewise in the uppermost position in readiness to yieldingly oppose the descent of the piston 10 located thereabove, see Figure 6.

As the mould 2 is being charged under pressure the piston 10 therein is forced downwardly and is yieldingly opposed by the plunger 17, the resistance of which is sufficient to cause the butter to intimately contact and conform with the shape of the mould but is insufficient to restrict the downward motion of the piston 10.

The associated arcuate plate 20 moves synchronously with the descending piston, and as the latter attains its lowest position corresponding with the filling of the mould the leading end 21 of the said arcuate plate engages and depresses a spring controlled switch 22, thereby closing an electric circuit. The electric circuit includes an electro-magnet 23 which when the circuit is energized attracts a spring-controlled armature 24.

The armature 24 is carried by a sleeve 25, which extends through the winding 26 of the electromagnet 23 and is slidably mounted for longitudinal or endwise movement. Upon the inner end of the sleeve 25 is rotatably mounted a driving clutch member 27 which revolves continuously and is operatively connected with motive means, such as an electric motor M, as for instance by a chain 27a and sprockets 27b and 27c as illustrated, see Figures 1 and 6.

The sleeve 25 with the driving clutch member 27 thereon is mounted upon a normally idle shaft 28 to which is fixed a driven clutch member 29 adapted for complementary engagement with the driving clutch member 27.

Located between the driving and driven clutch members 27 and 29 is a spring 30 which normally maintains said clutch members disengaged and the armature 24 in spaced position from the winding 26.

Fixed to the shaft 28 is a worm 31 which is meshed with a worm wheel 32 secured to the sleeve 4 carrying the bank of moulds 2, as herein previously described.

The movement of the armature 24 following upon the closing of the electric circuit forces the continuously rotating driving clutch member 27 into engagement with the driven clutch member 29 in opposition to the spring 30, thereby setting the shaft 28 in motion and through the worm 31 and worm wheel 32 rotating the sleeve 4 and the bank of moulds 2. The rotation of the moulds 2 is continued until the arcuate plate 20 has travelled over and releases the spring controlled switch 22 at which instant the electric circuit is opened and the winding 26 de-energized, thus permitting the spring 30 to return the armature 24 to its normal position and simultaneously disengage the clutch members to stop rotation of the bank of moulds 2.

The intermittent rotation thus effected of the bank of moulds 2 is such as to displace the filled mould from beneath the feed pipe 7 and locate below said pipe the successive empty mould 2.

During the period of time the charged mould 2 is being replaced by the next mould to be charged, the butter continuously flowing through the feed pipe 7 is forced into and temporarily stored in a cylinder or trap 33 vertically located above and connecting with the feed delivery pipe 3, see particularly Figure 3. This cylinder or trap 33 is provided with a spring-controlled plunger 34 adapted to discharge the stored butter into the next empty mould 2 when the said mould becomes located beneath the feed pipe 7.

When this second mould 2 becomes charged, a similar cycle of operations, to that above described, takes place and the first charged mould 2 moves to its third position. During this latter movement the roller 13 mounted on the lower end of the extension 11 of the piston 10 of the first charged mould 2 engages the ramp 14 causing the piston 10 of said mould to be forced a predetermined distance upwardly into the mould thereby partly discharging the moulded butter. The butter remains partly discharged until the bank of moulds 2 commences to rotate during the next stage of movement, when the said mould 2 moves to its fourth position. During the latter movement the piston 10 is forced upwardly to bring the top of said piston flush with the adjacent surrounding top surface of its mould 2, thereby fully discharging the moulded block of butter B, enabling same to be packed within a suitable box (not shown).

The discharged mould 2 during the next rotational step is returned to its first position beneath the feed pipe 7 and quadrant plate 9 in readiness for re-filling.

At a position corresponding to the end of the third rotational stage of the moulds, the ramp 14 supporting the piston of the mould 2 terminates in a horizontal track 35 (see Figure 6), thereby retaining the said piston 10 flush with the top of the mould and acting as a means for guiding the roller 13 on the extension 11 of said piston on to the top of the stem 18 of the plunger 17 of the air cylinder 16.

In order to vary the size and weight of the moulded blocks of butter, the effective stroke of the pistons 10 in the moulds 2 is adjustable, thus a piston when being depressed in the charging of a mould at the filling position may move downwardly to a greater or less extent before the associated roller 13 arrives at the ramp track 14 and the arcuate plate 20 moving synchronously with said piston contacts with the spring controlled switch 22.

To vary the extent of travel of the piston 10 in the mould 2, the ramp track 14 and switch 22 are arranged to be adjustable vertically by mounting said switch as well as portion of the ramp track 14 upon the platform 15 and providing the same with a vertical adjustment.

The ramp track 14 comprises a movable portion 14a and fixed portion 14b, the former portion being secured to and movable with the platform 15, while the portion 14b extends through said platform and is fixed to the base of the supporting frame 1. This provides a portion of said ramp track fixed relatively to the moulds 2, so that the top of the pistons 10 will always register flush with the top of the mould 2 at the filling and discharging positions.

For the purpose of adjusting the height of the platform 15 and the portion 14a of the ramp track 14 and switch 22 carried by said platform, the said platform 15 is supported adjacently to each corner by a rotary nut 36 in threaded engagement with a screwed pillar 37. For convenience and for the purpose of uniform adjustment, each of the nuts 36 is provided with a sprocket 38 and the said sprockets are interconnected and associated by a chain 39 with a sprocket 40 having a head 41 adapted for engagement by a spanner or other manually operated tool or instrument, whereby the said sprockets and nuts 36 may be adjusted simultaneously.

Referring now to Figures 7 to 11, the modified apparatus shown therein comprises a bank of smaller moulds preferably ten in number, each mould having a capacity of approximately one pound of butter.

In this modified apparatus, butter is fed into, and discharged from, the bottom of the mould in order that the moulded blocks may be discharged on to a moving endless conveyor from which the said blocks are taken to be wrapped and eventually packed.

As in the previously described form of moulding apparatus, a supporting frame 42 carries a bank of vertically disposed moulds 43 spaced in fixed relation to one another and at equal intervals in concentric arrangement about a central post or axis 44 fixed in the supporting frame 42.

The bank of moulds 42 is carried by a sleeve 45 mounted on bearings 46 and 47, so that said bank is freely rotatable about the post or central axis 44 to set the open bottom of each mould 43 successively in register with a feed pipe 48 delivering under pressure the butter to be moulded.

Each mould 43 is provided with a piston 49 having an upwardly extending piston rod 50, and each of said piston rods at the upper end carries a plate 51 adapted to contact a spring controlled switch 52 governing the rotation of the bank of moulds 43.

Secured to each piston rod 50 is a bracket 53 which extends outwardly and radially with respect to the central post or axis 44, see particularly Figure 10.

The outer end of each bracket 53 is provided with a roller 54 movable within an adjustable cam track 55 located above the bank of moulds 28 and disposed concentrically in relation to the same and the central post or axis 44.

The cam track 55 retains the piston 49 of each mould 43 in a fully raised position whilst said mould 43 is moving from the charging position to a position where the said mould commences to be discharged, at which latter position the cam track 55 inclines downwardly and thereby causes the piston 49 of each mould 43, on reaching such point, to be forced downwardly and thus discharge the moulded block of butter from the said mould 43.

The butter to be moulded is delivered under pressure through the feed pipe 48 into the bottom of the mould 43 located directly over the discharge end of the said feed pipe.

The entry of the butter under pressure into the mould 43 forces the piston 49 therein upwardly until the mould becomes fully charged, at which time the plate 51 on the top of the piston rod 50 contacts with and operates a spring controlled switch 52, thereby closing an electric circuit.

The electric circuit includes an electromagnet governing the action of operative mechanism whereby the bank of moulds 43 is moved through a rotational step controlled by the plate 51 which to terminate the rotational step releases the spring controlled switch to open the circuit and stop the operative mechanism.

Figure 1:
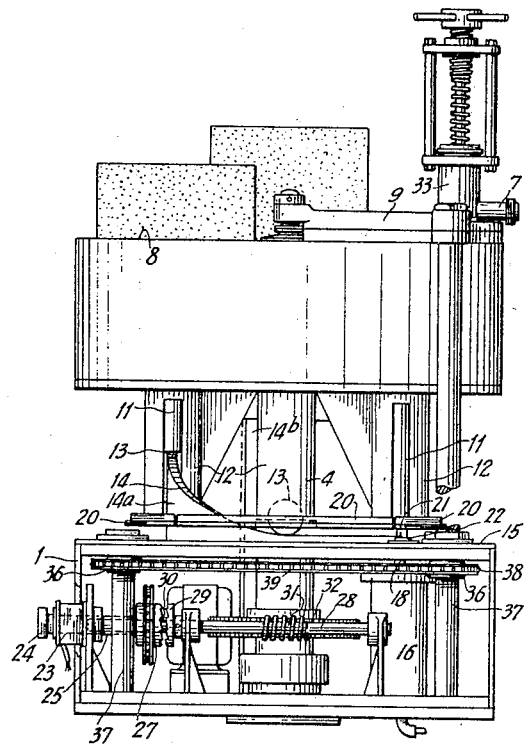
Figure 1 is a side elevation of apparatus for automatically moulding blocks of large dimensions such as blocks of butter of 56 pounds weight.
Figure 6:
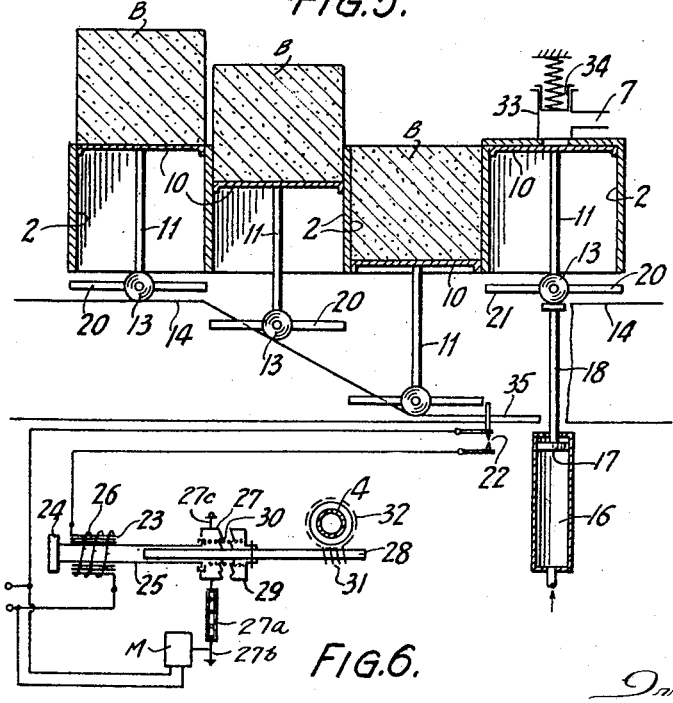
Figure 6 is a diagrammatic view illustrative of the sequence of operations and the means whereby stepped rotational movement is effected in the moulding apparatus shown in Figure 1.

The electro-magnet and the associated operative mechanism is located in the base of the apparatus and being precisely similar in construction and operation to the electro-magnet and operative mechanism previously described herein with reference to Figures 1 and 6, needs no further description.

The stepped or intermittent rotation of the bank of moulds 43 is such as to displace the filled mould and locate the successive empty mould above the feed pipe 48 at the filling position.

During the short period of time in which the charged mould 43 is being replaced by the next mould to be charged the continuously flowing butter is forced into and temporarily stored in a spring loaded trap 56 located vertically below and connected with the feed pipe 48.

To vary the size and weight of the moulded blocks of butter, the effective stroke of the pistons 49 is made adjustable by arranging the cam track 55 and the spring controlled switch 52 to be vertically adjustable in relation to the bank of moulds 43.

For the purpose of providing vertical adjustment of the cam track 55 and the switch 52, the latter is carried by a bracket 56 fixed to the former, and the said cam track is suspended from the top of the supporting frame by adjustably extensible members 57.

The adjustably extensible members 57 comprise upwardly projecting internally threaded tubular members 58 engaged by screwed shafts 59, which are rotatably mounted in bearings 60 depending from the top plate 61 of the supporting frame 42.

Each of the screwed shafts 59 carries a sprocket 62, and said sprockets are connected by means of a chain 63 with a sprocket 64 operable by a hand wheel 65, whereby through the chain 63 and sprockets 62 all of the screwed shafts 59 may be rotated simultaneously to raise or lower the tubular members 58 and the cam track 55 and the control switch 52 carried by the latter.

Position of the cam track 55 is horizontal to retain the rollers 54 and the pistons 49 in the uppermost position as the filled moulds 43 move from the filling position to the position at which discharge commences, see Figure 11.

Immediately adjacent the filling position the cam track 55 is provided with a safety ramp 66 to elevate the rollers 54 and the associated pistons 49, if the bank of moulds should be rotated without delivery of butter under pressure from the feed pipe 48.

A double ramp 67 is provided in the cam track 55 for the purpose of thrusting the pistons 49 downwardly to eject the moulded blocks from the moulds 43. The upper end of the ramp 67 is located at a point of the cam track 55 at which discharge of the moulded blocks commences, while the lower end of said double ramp is positioned to ensure that the pistons 49 are fully restored to the lower ends of the moulds in the final discharging position.

Although the blocks of butter are thrust from the moulds 43 by the pistons 49, said blocks are apt to adhere to the pistons, the weight (one pound) of the blocks being insufficient to detach them.

In order to detach the adhering blocks, a scraper 68 is provided which is reciprocated to remove the adhering blocks. The scraper may be actuated conveniently by the upward movements of the pistons 49 at the filling position.

For the purpose of thus actuating the scraper 68, each of the roller brackets 53 is provided with a tappet 69 which during the upward movement of each piston at the filling position engages an arm 70 on a rockable shaft 71. The shaft 71 is connected by a link 72 with an arm 73 on a rotatable shaft 74 which also carries an arm 75 connected by a link 76 to the reciprocable scraper 68. Accordingly, the upward movement of the tappets 69 through the mechanical association of the rockable shaft 71 with the scraper 68, operates the latter to detach the adhering blocks of butter. After each block detaching movement, the scraper 68 with the associated mechanical elements inclusive of the rockable shaft 71 is restored by a spring 77 to a normal position in readiness for operation by the next following tappet.

After the blocks of butter are discharged from the moulds 43, the former fall upon a conveyor 78 by which the said blocks are carried to a wrapping station or position.

The construction and mode of operation of this modified apparatus and of the moulding apparatus herein first described, are substantially similar, with the exception that as a consequence of the smaller moulds in the modified apparatus and resulting lighter moulded blocks, the weight of the pistons 49 and of the parts associated therewith is sufficient to compact and cause the butter to fill and conform with the shape of the mould without imposed loading such as that provided by the air cylinder 16 and plunger 17.

I claim:

1. Apparatus for continuously and automatically moulding butter or like mouldable products, comprising a multiple number of moulds for the reception of the mouldable product, means for moving said moulds in unison and succession to and from mould filling and discharging positions, means at the filling position for charging each mould in sequence with a mouldable product under pressure, a movable element in each mould yieldingly opposing the charging of the mould and resultantly displaceable to a predetermined position commensurate with a required mould filling, and means actuatable by each movable element on assuming the displaced position to actuate said first mentioned means and thereby move the moulds to remove a filled mould from the filling position, to bring the successive empty mould to the filling position and to impel a previously filled mould to the discharging position.

2. Apparatus for continuously and automatically moulding butter or like mouldable products, comprising at least one mould for the reception of the mouldable product, means for moving said mould to and from mould filling and discharging positions, means at the filling position for charging the mould with a mouldable product under pressure, a movable element in the mould yieldingly opposing the charging of the mould and resultantly displaceable to a predetermined position commensurate with a required mould filling, and means operable by the movable element to actuate said first mentioned means to move said mould between said positions.

3. Apparatus for continuously and automatically moulding butter or like mouldable products, comprising a multiple number of moulds for the reception of the mouldable product, means for moving the moulds successively to and from a mould filling position and a mould discharge position, a movable element in each mould yieldingly opposing the charging of the mould and resultantly displaceable to a predetermined position commensurate with a required mould filling, and means operable by the movable elements to actuate said first mentioned means to move said moulds between said positions.

4. Moulding apparatus as claimed in claim 1 wherein the moulds are disposed vertically and are open to receive mouldable products at one end, and including a closure member located at the filling position to contact closely with the open end of one of the moulds when at the filling position.

5. Moulding apparatus as claimed in claim 1 including a closure member located at the filling position and arranged to close the open end of a mould when at the filling position, said mould charging means delivering the mouldable product in a constant flow and injecting it under pressure through the closure member into the mould at the filling position, and a spring loaded trap associated with said closure member to receive and store the mouldable product when the empty moulds are out of engagement with the closure member.

6. Moulding apparatus as claimed in claim 1, wherein the movable element in each mould comprises a piston fitting and movable in the mould and actuated by forced injection of mouldable product into the mould, and wherein the piston by its weight yieldingly opposes the ingress of the mouldable product and compacts the said product to completely fill and conform with the shape of the mould.

7. Moulding apparatus as claimed in claim 1 wherein the movable element in each mould comprises a piston fitting and movable in the mould and actuated by forced injection of mouldable products into the mould, and wherein a fluid actuated device yieldingly opposes the ingress of the mouldable product and compacts the said product to completely fill and conform with the shape of the mould.

8. Moulding apparatus as claimed in claim 1 wherein the movable element comprises a piston fitting the mould and movable therein, an extension on said piston adapted upon the piston assuming the displaced position, to operate means for actuating said means for moving the moulds through a step in the cycle of discharging and returning the moulds to a filling position.

9. Moulding apparatus as claimed in claim 1, wherein the means for moving the moulds comprises a continuously rotating driving member, a driven member operatively associated with the moulds, and actuating means to operatively connect the said rotating driving member with said driven member to move the moulds.

10. Moulding apparatus as claimed in claim 1 wherein the means actuatable by the movable element on assuming the displaced position comprises an electric switch, and the said means for moving the moulds is electrically operated by the closing of said switch, and wherein the movable element maintains the switch in closed position to effect a step in the cycle of movement of the moulds and opens said switch at the conclusion of each step in the cycle.

11. Moulding apparatus as claimed in claim 1, wherein said actuating means and means for moving the moulds comprises a spring-controlled switch, an electrical circuit controlled by said switch, a switch operating plate moving synchronously with the movable element and operating to close said switch on the movable element assuming the displaced position, an electro-magnet included in the electrical circuit, a driven clutch member operatively connected with the moulds, and a continuously rotating clutch member operatively associated with the electro-magnet and engageable with the driven clutch member by the electro-magnet when the latter is energized by the closing of said switch.

12. Moulding apparatus as claimed in claim 1 including guide means to maintain the movable element at the displaced position during part of the movement of the mould to the discharging position, at which latter position the guide means returns the movable element to normal position so as to eject the moulded block from the mould.

13. Apparatus for continuously and automatically moulding butter or like mouldable products, comprising a multiple number of moulds for the reception of the mouldable product, means for moving said moulds in unison and succession to and from mould filling and discharging positions, means at the filling position for charging each mould in sequence with the mouldable product under pressure, a piston in each mould yieldingly opposing the charging of the mould and resultantly displaceable to a predetermined position commensurate with a required mould filling, an electric switch actuatable by a switch operating member carried on each piston upon the latter assuming a displaced position, said switch closing an electric circuit to energize the means for moving the moulds to remove a filled mould from the filling position, to bring the successive empty mould to the filling position and to impel a previously filled mould to the discharging position.

14. Moulding apparatus as claimed in claim 13 wherein the switch operating member moves relatively to the electric switch while maintaining the latter in closed position for a sufficient period to control the displacement of the moulds through one step in the complete cycle of said moulds.

15. Moulding apparatus as claimed in claim 13, including a roller carried on said piston, a cam track engageable by said roller, said cam track having a flat portion whereby the piston is maintained in the displaced position during part of the movement of the mould to the discharging position, and a ramp on said cam track at the discharging position engageable with the roller to retain or return the piston to normal position.

16. Moulding apparatus as claimed in claim 13 including means at the discharging position for detaching an adhering block of mouldable product from the piston.

17. Moulding apparatus as claimed in claim 13, including a roller carried on said piston, and a cam track engageable by said roller when the piston is in the displaced position, said cam track and electric switch being adjustable relatively to the piston whereby the distance of travel of the piston may be varied to regulate the quantity of mouldable product received in the mould.

18. In an apparatus for continuously and automatically moulding butter or like mouldable products having a multiple number of moulds for the reception of the mouldable product movable in unison and succession to and from mould filling and discharging positions, a movable element in each mould yieldingly opposing the charging of the mould and resultantly displaceable to a predetermined position commensurate with a required mould filling, and means operable by the movable element to effect movement of the mould between said filling and charging positions.

19. In an apparatus for continuously and automatically moulding butter or like mouldable products having a multiple number of moulds for the reception of the mouldable product movable in unison and succession to and from mould filling and discharging positions, a piston in each mould yieldingly opposing the charging of the mould and resultantly displaceable to a predetermined position commensurate with a required mould filling, and means operable by the piston to effect movement of the mould between said filling and discharging positions.

20. In an apparatus for continuously and automatically moulding butter or like mouldable products having a multiple number of moulds for the reception of the mouldable product movable in unison and succession to and from mould filling and discharging positions, a piston in each mould yieldingly opposing the charging of the mould and resultantly displaceable to a predetermined position commensurate with a required mould filling, an electric switch operable by a switch operating member carried by each piston upon the latter assuming a displaced position, and an electric circuit closed by said switch to energize means for moving the moulds through a step in the cycle of filling, discharging and returning the moulds to the filling position.

JOSEPH O'CONNELL.

REFERENCES CITED

The following references are of record in the file of this patent:

UNITED STATES PATENTS

| Number | Name | Date |
|---|---|---|
| 484,790 | Guerin | Oct. 25, 1892 |
| 518,625 | Pecht | Apr. 24, 1894 |
| 758,763 | Lutze | May 3, 1904 |
| 2,113,115 | MacMillin et al. | Apr. 5, 1938 |
| 2,370,920 | Schaub | Mar. 6, 1945 |